W. Clemson.
Saw.
N° 75734. Patented Mar. 24, 1868.
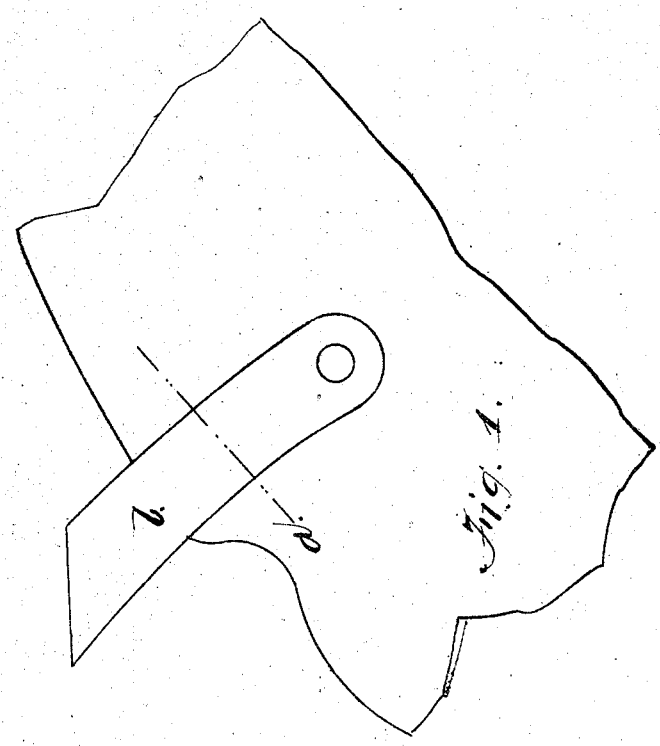
Attest:
Inventor:
Wm Clemson

United States Patent Office.

WILLIAM CLEMSON, OF MIDDLETOWN, NEW YORK.

*Letters Patent No. 75,734, dated March 24, 1868.*

IMPROVEMENT IN SAWS.

*The Schedule referred to in these Letters Patent and making part of the same.*

TO ALL WHOM IT MAY CONCERN:

Be it known that I, WILLIAM CLEMSON, of Middletown, in the county of Orange, and State of New York, have invented a new and useful Improvement in Saws; and I do hereby declare that the following is a full, clear, and exact description thereof, which will enable others skilled in the art to make and use the same, reference being had to the accompanying drawings, forming part of this specification.

Figure 1 is a section of saw-plate, showing a tooth inserted according to my invention.

Figure 2 is a cross-section through the plate at the dotted line $a$, fig. 1, showing the tongue and groove as they appear edgewise.

This invention consists in a form of tongue and groove that will prevent the springing or warping of the edge of the saw-plate.

Movable saw-teeth, tongued and grooved in the ordinary manner, if a good or "snug" fit is made of them, tend to expand and crook the edge of the plate, as does also the usual modes of securing them by rivets or screws. The same injury happens to the saw when it becomes heated on the edge from any cause while at work, which frequently occurs.

$b$, fig. 2, shows a groove of a common form, with a tongue fitted in that it only partly fills the groove. About the proportion of tongue shown is ample, with the usual modes of fastening the teeth, to secure them firmly in the saw-blade, and also to allow the edge of the plate to expand or lengthen directly, consequently without crooking, by permitting the tongues to be forced deeper in the grooves, causing their sides to spring away instead of warping the body of the plate, thereby allowing the saw-blade to expand and contract on the edge, without the teeth becoming loose or injuriously tight in the plate.

The tooth $b$ is made a trifle thinner than the saw-plate, in order that when the groove in the tooth is forced upon the tongues or inclined sides of the recess, the extreme edges of the grooves will slightly expand, and thereby firmly clasp the inclined sides of the recess, and hold the tooth in position. The tooth is also bent sidewise and twisted, which essentially contributes to aid in securing the tooth in the saw-plate.

I do not claim holding in these teeth with a spring pressure.

What I do claim, and wish to secure by Letters Patent, is—

The curbed tooth $b$, when constructed thinner than the saw-plate, slightly bent sidewise and twisted, in combination with the recess in the saw-plate, when said recess is constructed substantially as described.

WM. CLEMSON.

Witnesses:
ELISHA P. WHEELER,
JOS. A. DENT.